May 15, 1934.  W. N. QUARTZ ET AL  1,958,447
PIPE BEND AND METHOD AND APPARATUS FOR MAKING THE SAME
Filed Oct. 31, 1931    6 Sheets-Sheet 1
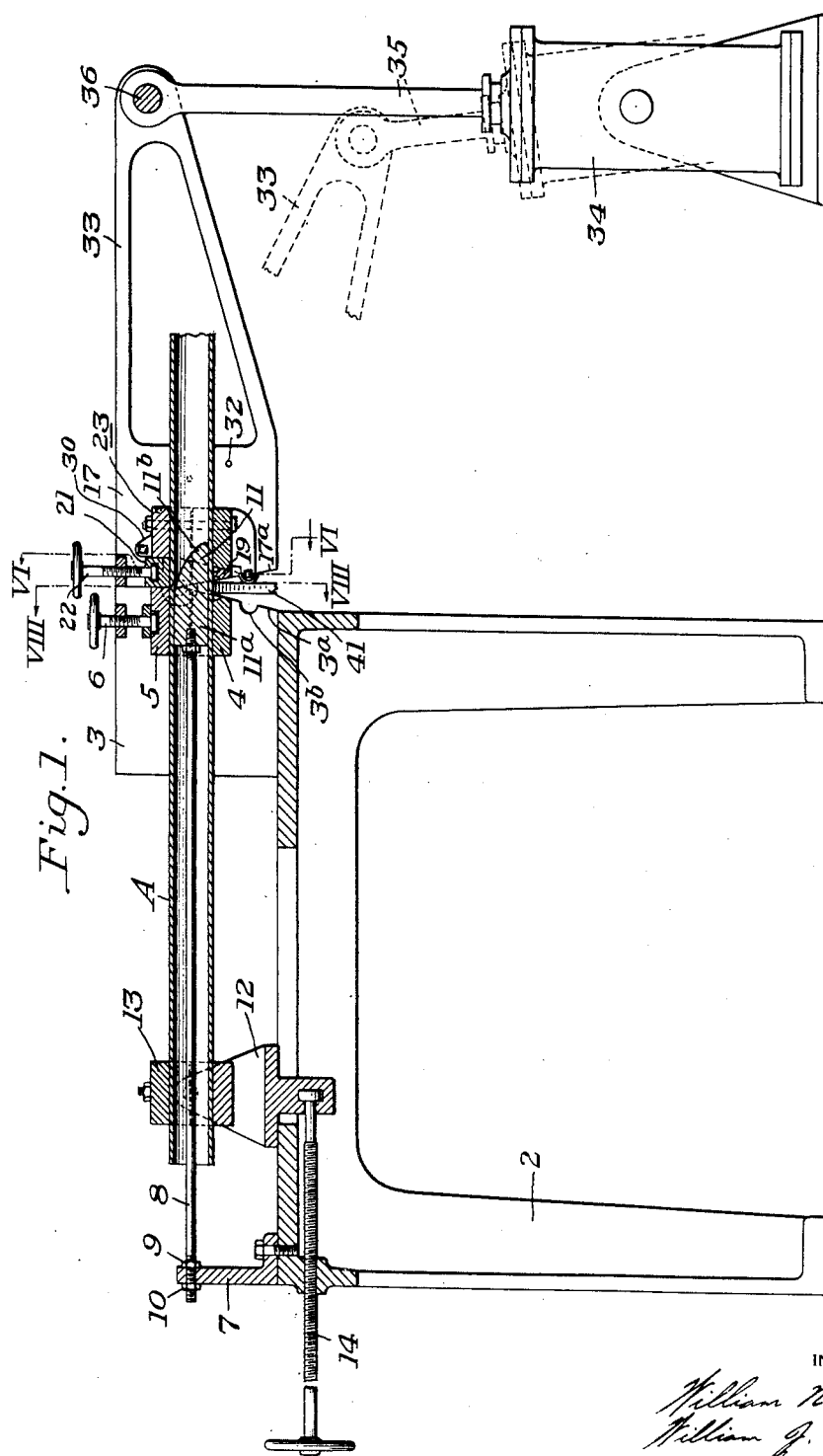
INVENTORS
William N. Quartz
William J. Hannon
by their attorneys

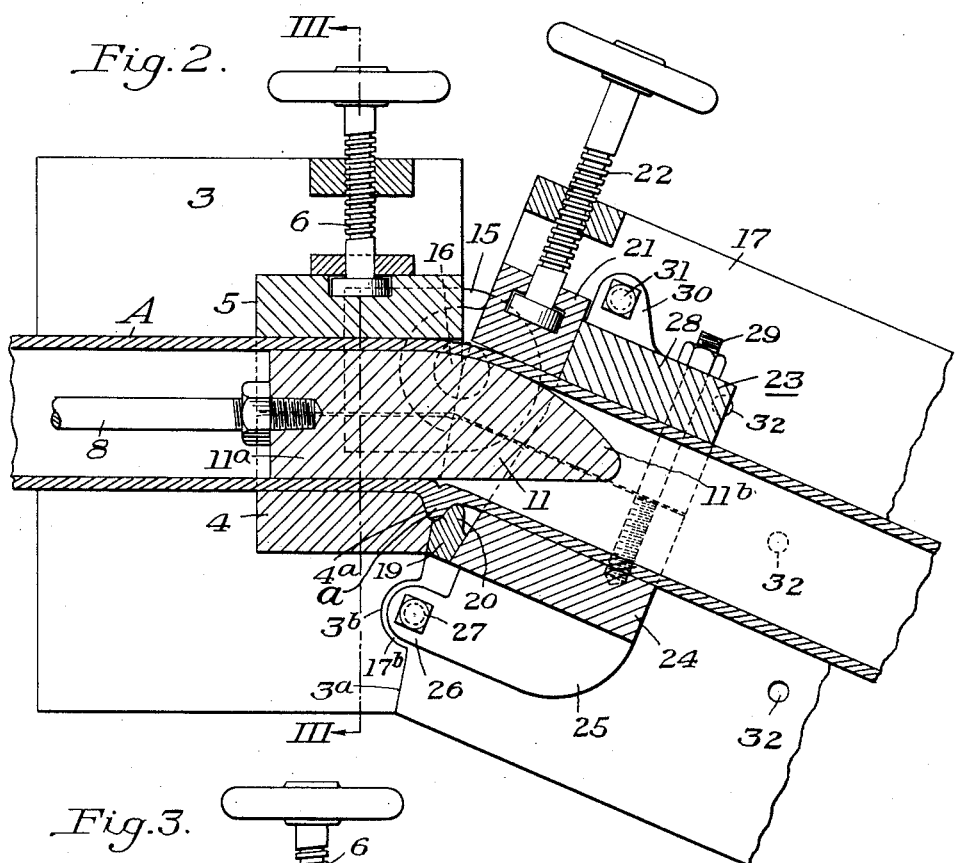
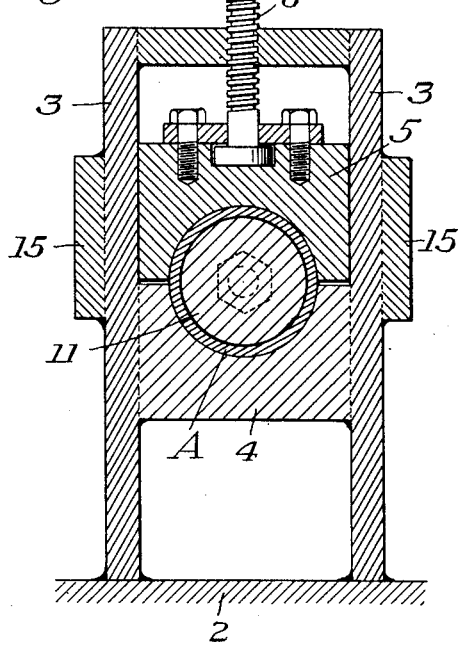
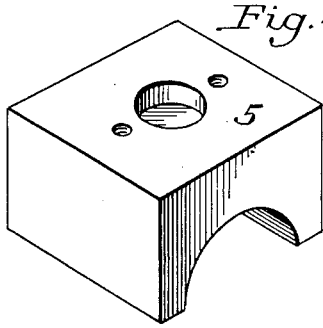

May 15, 1934.  W. N. QUARTZ ET AL  1,958,447
PIPE BEND AND METHOD AND APPARATUS FOR MAKING THE SAME
Filed Oct. 31, 1931   6 Sheets-Sheet 3
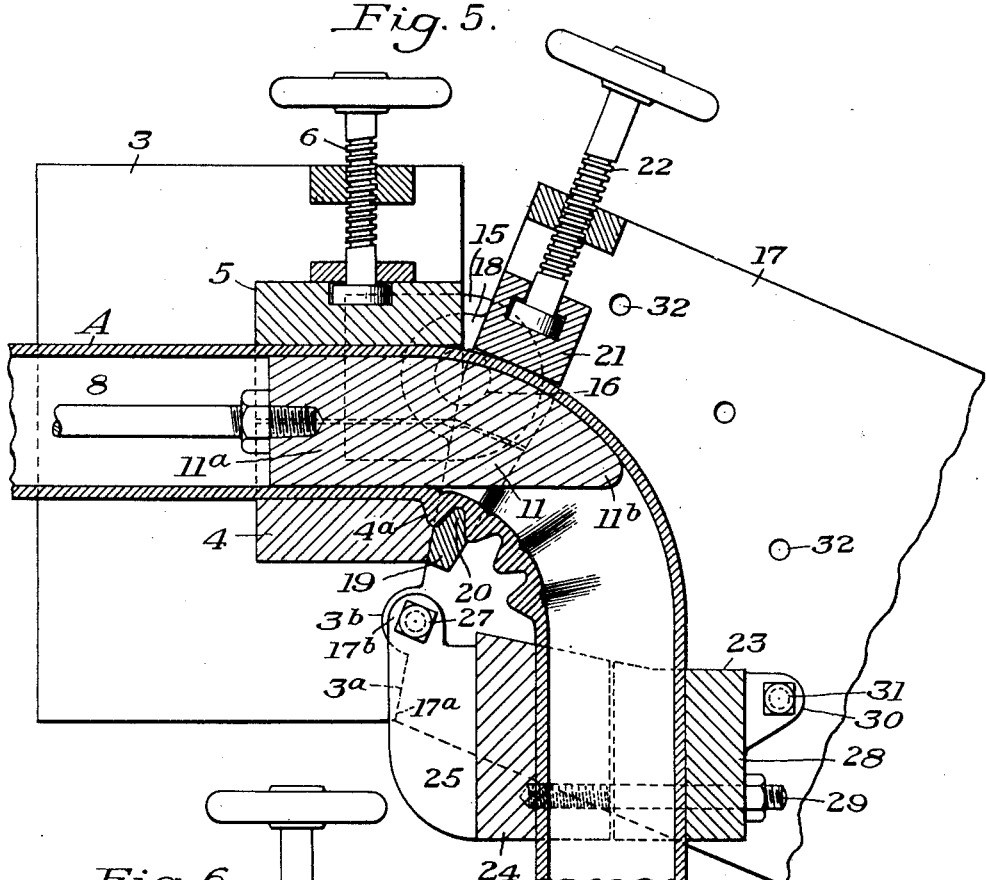
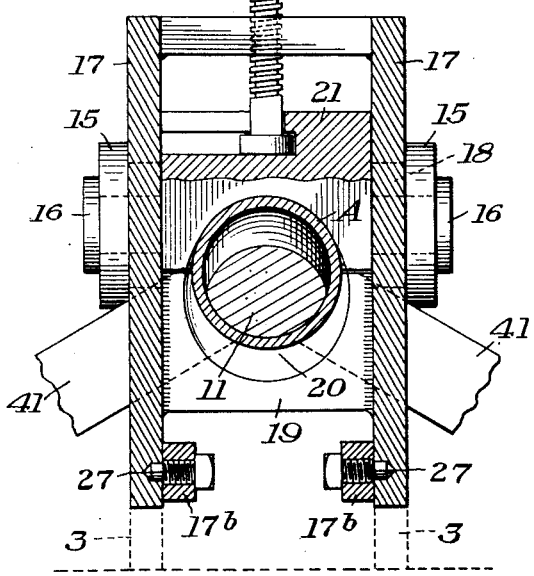
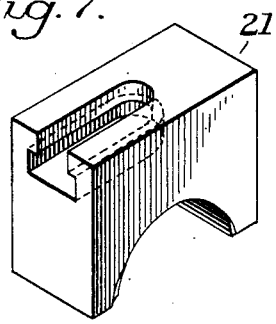
INVENTORS
William N. Quartz
William J. Bannen
by their attorneys May 15, 1934.    W. N. QUARTZ ET AL    1,958,447
PIPE BEND AND METHOD AND APPARATUS FOR MAKING THE SAME
Filed Oct. 31, 1931    6 Sheets-Sheet 4

INVENTORS
William N. Quartz
William J. Bannon
by their attorneys

May 15, 1934.  W. N. QUARTZ ET AL  1,958,447
PIPE BEND AND METHOD AND APPARATUS FOR MAKING THE SAME
Filed Oct. 31, 1931   6 Sheets-Sheet 5
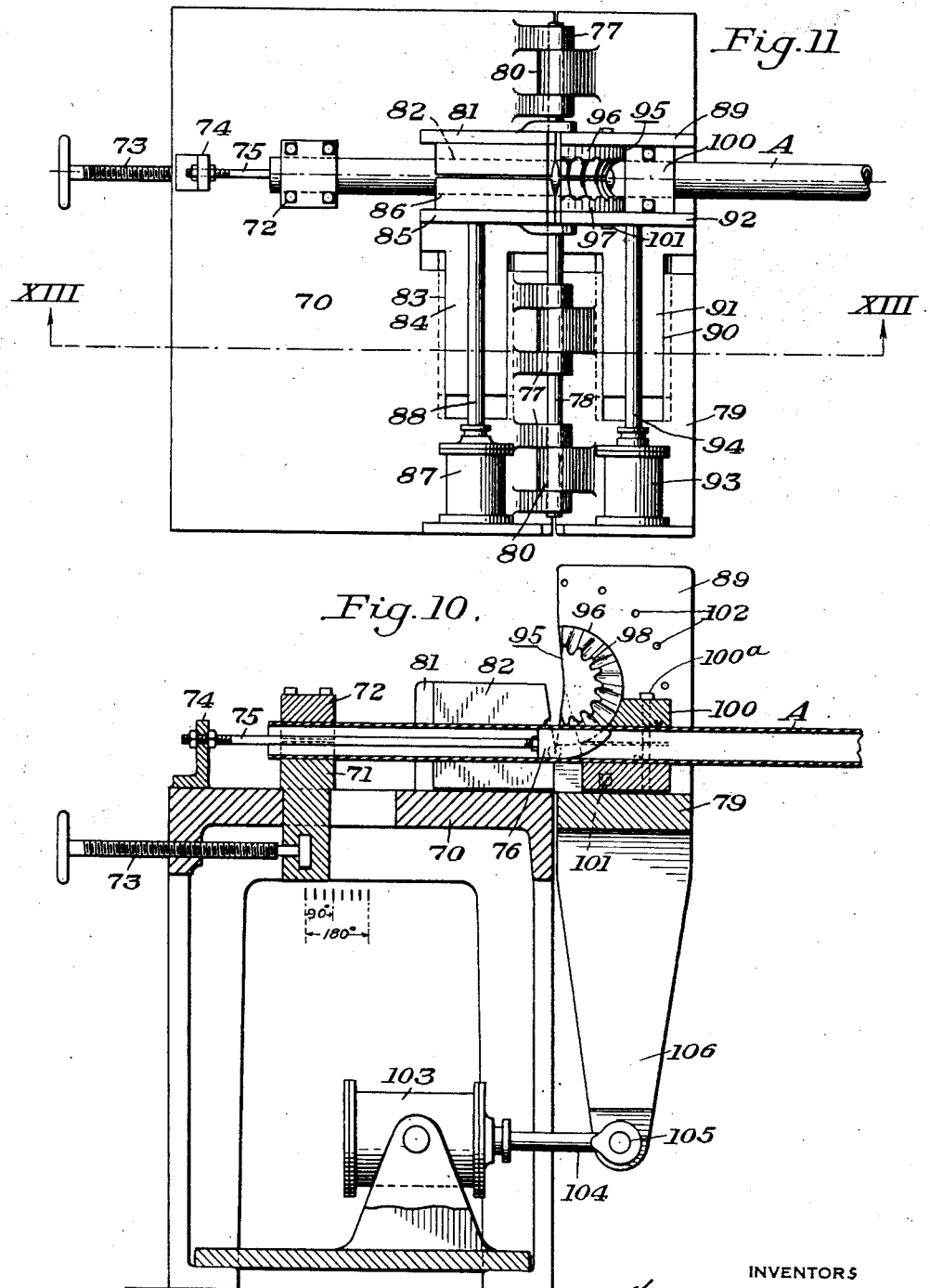
INVENTORS

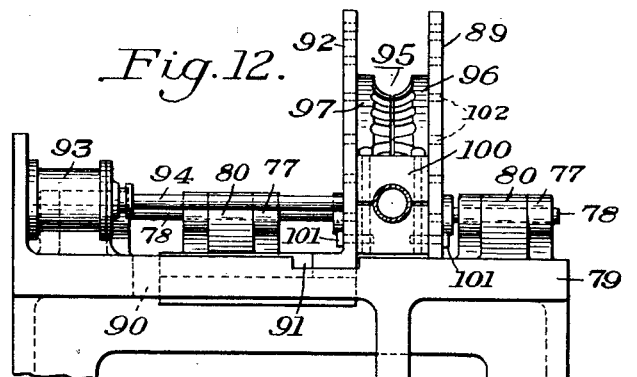
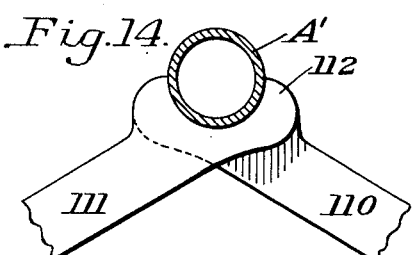
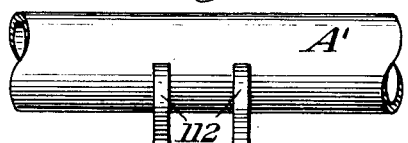
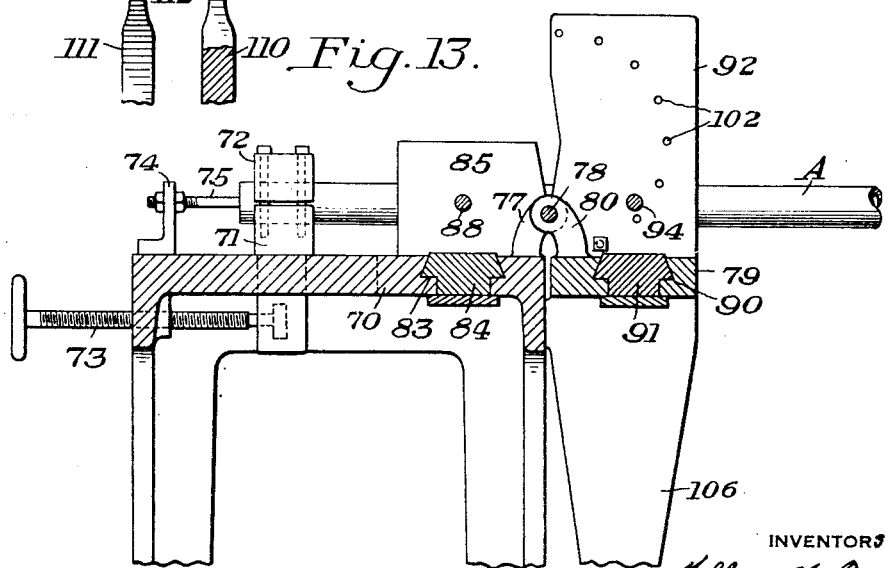

Patented May 15, 1934

UNITED STATES PATENT OFFICE 1,958,447

PIPE BEND AND METHOD AND APPARATUS FOR MAKING THE SAME

William N. Quartz, Pittsburgh, and William J. Bannen, Oakmont, Pa., assignors to Power Piping Company, Pittsburgh, Pa., a corporation of Pennsylvania Application October 31, 1931, Serial No. 572,338

33 Claims. (Cl. 219—1)

This invention relates to the bending of pipe, and particularly the bending of pipe on a short radius relative to the diameter of the pipe, and is for an improved bend for pipe and the improved method and apparatus for producing the bend.

When a piece of pipe is bent, the metal beyond the center of the pipe is put under tension while the metal between the center of the pipe and the center of curvature is put under compression. Consequently if a piece of pipe is merely heated at the point where the bend is to be made and curved around, the metal around the outside of the bend is stretched and weakened and the metal on the inside is distorted. The pipe then tends to flatten out, and the sharper the bend the greater is the distortion.

It has heretofore been proposed to bend pipe by forming creases on the inside of the bend at spaced intervals. By so doing, an excess length of metal can be formed into the inside of the bend, the length of metal thus taken up being sufficient to relieve the outside of the curve from any substantial straining or stretching. That is to say, instead of stretching the outside of the bend, an excess length of pipe is used sufficient to prevent stretching and the excess length at the inside of the bend is formed into spaced transverse grooves or corrugations or externally protruding ribs.

As heretofore constructed, the metal thickness in the walls of these corrugated portions has remained about the same thickness as the original pipe, and the excess length has been taken entirely by bulging the pipe. According to the present invention, the bend is made by forming a plurality of creases in the pipe, but the metal is also upset so that the wall thickness in the corrugations or creases is considerably more than the original thickness of the pipe. By reason of this fact a greater length of original pipe is concentrated in each resulting crease or corrugation. The corrugations or creases can therefore be much closer together, which means that the bend can be made about a shorter radius.

Since, in forming the bulges or corrugations in bending the pipe the original grain structure of the metal is considerably distorted, it is of advantage to increase the wall thickness of the pipe at such points, as well as to reduce the radius and enable the bend to be made more sharply and consequently in a smaller space. It is also desirable to eliminate the interior pockets in the pipe where these corrugations are made.

The flowing of the excess metal into these corrugations or ribs is accomplished by the use of a novel method and apparatus which can be easily practiced and cheaply constructed and which results in the forming of pipe bends on an economical basis.

The invention may be readily understood by reference to the accompanying drawings in which Figure 1 represents a longitudinal section through an apparatus developed for effecting the process, showing the straight pipe in the machine prior to bending;

Figure 2 is a view on a larger scale representing a longitudinal section through the bending elements of the machine, the parts being shown in the position which they assume after the first bending operation has been completed, but before the parts have been reset to effect the next bending operation;

Figure 3 is a transverse section in substantially the plane of line III—III of Figure 2;

Figure 4 is a perspective view of one of the pipe clamping blocks comprising a part of the mechanism shown in Figs. 2 and 3;

Figure 5 is a view similar to Fig. 2 showing the position of the parts after the last bending operation in producing a 90° bend in a piece of pipe;

Figure 6 is a transverse section in substantially the plane of line VI—VI of Fig. 1;

Figure 7 is a perspective view of one of the clamping blocks comprising part of the apparatus;

Figure 10 is a view similar to Fig. 1 of another modification wherein a different form of pipe support in the movable bending die is employed;

Figure 11 is a top plan view of the apparatus shown in Figure 10;

Figure 12 is a front elevation of the machine shown in Fig. 10, the view being a view looking at the machine toward the left as viewed in Fig. 10;

Figure 13 is a transverse longitudinal section in substantially the plane of line XIII—XIII of Fig. 11;

Figure 14 is a fragmentary view showing another disposition of the electrodes for heating the pipe; and Figure 15 is a side elevation of the arrangement shown in Figure 14 showing the longitudinal spacing of the electrodes.

Figure 8:
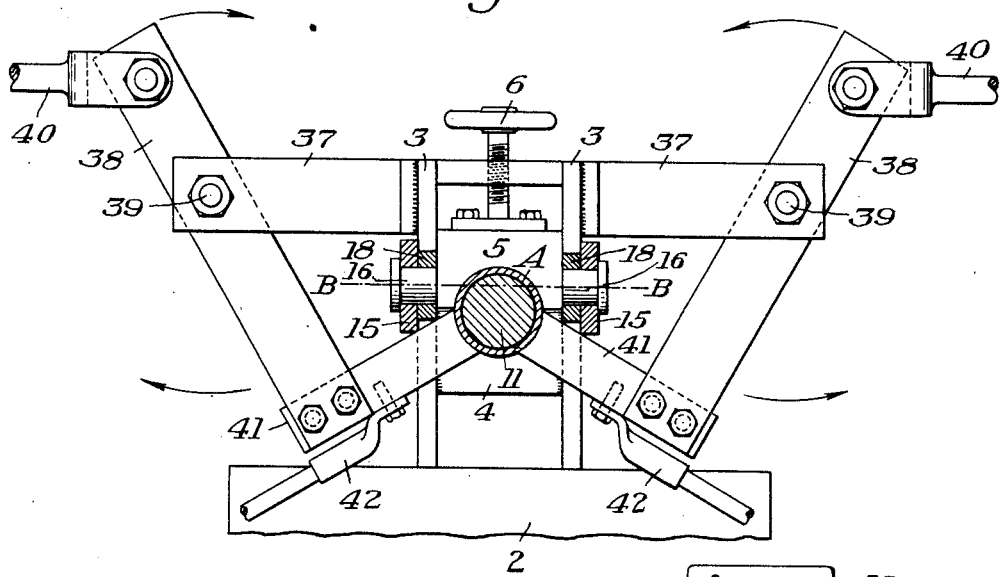
Figure 8 is a transverse sectional view in the plane of line VIII—VIII of Fig. 1 showing the heating electrodes in contact with the pipe.

Referring first to the construction shown in Figs. 1 to 7, inclusive, 2 designates a stationary frame or table on which is carried a pair of spaced apart upright stationary supporting plates 3. Between the stationary supporting plates 3 is a pipe clamp comprising a fixed lower clamp member or block 4 which is grooved on its upper surface to conform to the diameter of the pipe for which the machine is constructed, and a vertically movable clamping block or member 5 also curved to fit the pipe. We have shown a hand screw 6 for raising the block 5 up and down with respect to the block 4.

Carried on the stationary base or table 2 is an upright bar supporting bracket carrying a plug bar or rod 8. Nuts 9 and 10 provide a slight longitudinal adjustment of the plug bar 8. At the free end of the plug bar or rod 8 is a plug or mandrel 11. This mandrel preferably has a fully cylindrical rear portion 11a and a forward portion 11b, the top of which is curved to conform to the curvature to be produced in the pipe. The slight adjustment of the bar 8 provided by the nuts 9 and 10 enables the plug or mandrel 11 to be accurately positioned in the machine.

Mounted on the base or table 2 is a longitudinally movable support 12 which carries a pipe clamp 13, this pipe clamp preferably being supported on trunnions on the support 12. A hand screw 14 is provided for effecting longitudinal movement of the pipe.

In Figure 1 and in the other figures we have shown the pipe in position in the machine. The pipe is designated A and in Figure 1 no bends have been made in it. The forward ends of the side plates 3 are provided with forwardly projecting lugs 15 for the support of pivot pins 16, the exact position of which is best shown in Figure 8. Below the center of these pivot pins 16 the ends of the plates 3 are rearwardly tapered or beveled, as indicated at 3a, and they have recesses 3b in such tapered or inclined faces.

Supported in longitudinal alinement with the plates 3 are a pair of movable side plates 17 having ears 18 thereon through which the pivot pins 16 pass, and the ends of the plates 17 are also beveled or inclined as indicated at 17a, these corresponding to the surfaces 3a. By reason of the pivotal mounting afforded by the pins 16, the side plates 17 can be moved in a limited arc vertically with respect to the side plates 3. The downward swing of the plates 17 is stopped when the inclined surface 17a comes against the inclined surface 3a, and the upward movement is stopped when the alined end faces of the plates 3 and 17 come into contact above the pivots 16. In Figure 1 the plates 17 are at the uppermost limit of their movement, and in Figure 2 the plates 17 are at the downward limit of their movement.

In the particular machine illustrated in the drawings the arc of movement is 22½°, but this, it will be understood, may be varied, and this figure is merely given for the purpose of illustration.

The movable plates 17 are connected together to form a rigid frame, and supported between these plates is a bending clamp comprising a fixed lower die block 19 having a pipe engaging portion 20 thereon, best shown in Figure 2, and which has a bevel on both sides thereof so that the die block itself appears to be in the form of a tooth. The depth of the bevel increases from the sides of the die block toward the center thereof.

The lower block 4 between the plates 3 has a bevel portion 4a at its forward end, the slope of which corresponds to the slope of the side of the tooth-like pipe engaging portion or rib 20 so that when the two members 19 and 4 are in contact, as shown in Figure 2, there is a groove or recess formed by the complementary portions of the tooth 20 and the block 4.

Mounted for movement up and down between the plates 17 for cooperation with the bending die 19—20 is a pipe engaging block or clamp member 21. This member may be screwed up and down by means of a hand screw 22.

Positioned between the side plates 17 and independent of the members 19 and 21 is an adjustable pipe clamping unit 23. This clamping unit 23 comprises a lower clamp member 24. The lower block 24 has downwardly extending side flanges 25 on which are ears 26 through which pass set screws 27 that engage in recesses or holes in the side plates 17, these set screws providing a pivoting support for the lower block 24. The tapered or inclined ends of the plates 17 are provided with rearwardly projecting ear portions 17b into which the set screws 27 extend, and it will be noted that by thus offsetting the set screws 27 the center about which the block 24 can be adjusted coincides with the center about which the bend of the pipe is made.

The clamping unit 23 also comprises an upper block 28 which is secured to the lower block 24 by means of bolts 29, there being one bolt at each side of the axis of the pipe. The two clamping blocks 24 and 28 have complementary openings therethrough to receive the pipe A and enable the pipe to be clamped therein.

The upper block 28 has an upwardly extending lug 30 thereon at each side thereof, these lugs being close to the side plates 17. A set screw 31 passes through each lug 30 and the end of it may be selectively engaged in holes or recesses 32 in the side plates 17. The holes or recesses 32 are arranged in an arc about the axes of the set screws 27 as a center, and where the vertical movement of the side plates 17 is 22½°, the recesses 32 are 22½° apart.

The ends of the side plates 17 are projected into a forwardly extending frame portion 33 by means of which the plates may be moved up and down. For effecting this movement we have shown a suitably supported hydraulic cylinder 34. The piston rod 35 is connected at 36 with the outer end of this frame 33. In place of this mechanism it will be understood, however, that hand power, weights, or any other suitable arrangement may be provided for working the plates 17 up and down.

Extending out from the side plates 3 at each side of the machine are supporting arms 37. These arms carry levers 38 which are pivotally supported on the arms 37 at 39. Connected to the upper end of each lever 38 is an operating link 40 which may be connected with a fluid pressure cylinder or other source of power (not shown). Carried at the lower end of each lever 38 is a rigid electrode 41 having an outer end curved to conform to the curvature of the pipe. The numeral 42 designates a connector through which the low voltage high amperage current is conducted to the electrodes. It will be observed that the two electrodes engage the pipe below the longitudinal axis thereof. The space between the beveled faces 3a and 17a of the side plates 3 and 17, respectively, provides a crevice through which the electrodes may be moved into contact with the pipe. In Figure 8 the electrodes are shown in contact with the pipe, but by moving the levers 38 in the direction of the arrows shown in Figure 8, the two electrodes may be swung clear of the space between the plates 3 and 17. This movement of the electrodes toward and from the pipe engaging position is effected through the links 40 and such operating means as may be provided to move the links.

In operating the machine, the end of the pipe A is slipped through the clamping unit 23 while the clamping blocks 21 and 5 are lifted, and inserted in the clamp 13, the pipe passing over the mandrel 11. The clamp 13 is then tightened on the pipe and the clamping blocks 5 and 21 are screwed down tight by operation of their respective hand screws and the units 24 and 28 of the clamping block 23 are brought together by means of nuts 29. At this time, of course, the pipe is straight and the set screws 31 are entered in the uppermost holes or recesses 32 of the series while the set screws 27 are entered into their corresponding recesses.

It will be observed that the center line B—B of the pivot pins 16 is above the longitudinal axis of the pipe and relatively close to the top of the pipe.

When the parts have all been clamped in position, as described, the links 40 are operated to swing the electrodes 41 into pipe engaging position as shown in Figure 8 and to press them against the pipe to assure good contact therewith. The current supplied to the electrodes may come from a welding type transformer or any other source of low voltage high ampere current. The engagement of the electrode with the pipe produces a local zone of heating in the lower portion of the pipe at the point where the first bend is to be made. When the current has been applied for a length of time sufficient to bring the lower part of the pipe to a forging heat or proper working temperature, the electrodes 41 are swung out of position and the piston 34 is operated to pull down on the extension 33, rocking the plates 17 and the parts carried thereby down through their full arc of movement. Since the arc of movement is about the axis of the pins 16, it will be seen that the metal below the longitudinal axis of the pipe is put under compression, causing it to flow into the recess provided between the tooth 20 and the beveled surface 4a, thus forming a bead or rib on the pipe transversely thereof and of decreasing height from the bottom of the pipe up each side to a point adjacent or slightly above the horizontal center of the pipe. Since, however, the top of the pipe is so nearly in line with the axis of the pivots 16 very little stretching of the metal occurs in the upper part of the pipe.

The bending therefore occurs almost entirely by the compressing and upsetting of the inner side of the curve rather than the stretching and pulling of the metal at the outside of the curve. The curvature of the mandrel 11 serves to hold the pipe against collapse. Since the bending is effected through the upsetting of the metal on the inside of the bend, the pipe is shortened with the bending.

After the first bend has been completed and assuming that a 90° bend is to be made, the hand screws 6 and 22 are operated to release the clamping blocks 5 and 21, respectively. The set screws 31 of the clamping unit 23 are then unscrewed so as to disengage the recesses 32, and the set screws 27 are unscrewed so as to disengage their recesses, thus releasing clamping block 23 from the movable side plates 17 but leaving it firmly attached to the pipe. When this has been done the pipe A, as viewed in Figure 2, can be lifted up until the upset or crease a will clear the tooth 20 of the bending clamp. After the clamps have all been loosened, the cylinder 34 is operated to raise the movable side plates 17 to their normal horizontal position. The pipe is then moved forwardly, by operation of the screw 14, until the crease a which has been formed lies over the rib or tooth 20, but is in contact therewith. When the plates 17 move up, the clamps of course are all loose and no bending pressure is put on the pipe at all. The end of the pipe which has been bent downward 22½° in the preceding operation therefore continues to slope down at an angle of 22½°.

Since the set screws 31 and 27 are unattached to the side plates 17, the clamping unit 23 thus retains the angular inclination of the pipe, and as the side plates 17 move up, the set screws 31 will register with the next succeeding holes or recesses 32 in the side plates 17 and the set screws 27 will register with their holes or recesses in ears 17b of side plates 17. After the parts are in this position the set screws 31 are tightened into the recesses 32 with which they register and the set screws 27 are tightened into their recesses and the clamping blocks 5 and 21 are screwed down into clamping engagement with the pipe by their respective hand screws 6 and 22. When all of the clamps are tightened, the electrodes 41 are again moved into pipe engaging position, the pipe heated up and the bending operation repeated. The number of times that the operation is repeated depends on the degree of turn which is to be effected and the amount of bending that is effected with each operation. For instance, where the machine with each operation bends the pipe 22½°, the operation is repeated four times to make a bend of 90°. If, however, the machine only bends the pipe through an angle of 18° with each operation, five operations would be made to make a 90° bend.

In Figure 5 we have shown the position of the parts after the completion of the fourth bend. It will be noted that the only difference in the position of the parts from Figure 2 is that the set screws 31 of the clamping unit 23 are in the last holes 32 of the series instead of the first. If a turn of more than 90° is to be made, additional operations can be carried out.

The operation of the machine can be carried out quite rapidly, it being possible to complete a 90° bend in a very few minutes. The purpose of the clamps 4 and 5 is of course to hold and support the pipe A against endwise movement. The purpose of the clamp comprising the bending die 19 with its rib 20 and the cooperating clamping member 21 is to exert the upsetting action by means of which the length of metal on the inside of the bend is shortened. The particular advantage of having this shape of a rib or tooth is that it may enter between the ribs or beads that are formed on the pipe, as shown in Figure 5, providing clearance for these ribs or beads and also locking the pipe against creeping.

The purpose of the independently pivoting clamping unit 23 is to hold the bent end of the pipe in the proper position while the next bending operation is being effected, and also to hold the pipe against creeping. The bending leverage on the pipe is really exerted through the clamping unit 23. The shape of the ends of the plates 3 and 17 definitely limits the movement of the plates to a restricted arc and furthermore permits the electrodes to be brought into contact with the pipe and then swung clear of the machine during the bending operation. The pipe supporting clamp 13 with its carriage 12 and screw 14 provides a convenient means for moving the pipe forward the necessary increment of length after each bending operation, and markings may be put on the table of the machine, as indicated, to facilitate the gauging of the distance.

As previously indicated, the length of metal on the inside of the bend is actually reduced by a definite upsetting action and the rib or ribs $a$, instead of being in the shape of an open corrugation, are comprised of solid metal and the indentation on the inside of the pipe is relatively slight. Instead of stretching the outside of the pipe to any material extent, the inside of the pipe bend is shortened and compressed.

The joint itself is an improvement over corrugated joints as heretofore formed because of the fact that the metal on the outside of the bend is put under little strain while the metal walls on the inside of the bend where the normal grain of the metal is disturbed is thickened and reinforced. The presence of the relatively shallow transverse grooves on the inside of the pipe are less objectionable than the corrugated inside surface heretofore produced. By reason of the fact that the metal is forced together or upset and crimped to form solid ribs, the individual ribs are of smaller dimensions than the corrugations heretofore contemplated, and can be closer together, one being formed closely adjacent the other without any intervening space, whereby the bend is not only stronger, but can be made on a shorter radius.

The particular construction as described shows a complete embodiment of the invention, but it will be understood that various changes and modifications are contemplated. By way of illustration, reference is had to the construction shown in Figure 9 wherein the arrangement of parts is substantially reversed with respect to that shown in Figure 1, so that in making the bend the curve is made upwardly instead of downwardly. Such an arrangement is desirable where the bend is to be made near the end of a long piece of pipe or where the bend is to be through an arc of more than 90°. In the arrangement shown in Figure 9, 2a designates the frame or bed of the machine having side plates 43 with a pipe clamping unit therebetween, this unit having a fixed upper block 44 and a movable lower block 44a, this being just the reverse of the arrangement previously described. We have shown in place of a hand screw a fluid pressure cylinder 45 for opening and closing the clamping unit 44a. The bed of the machine carries an upright support 46 to which is attached a plug bar 47 having a plug or mandrel 48 at the outer end thereof similar to the mandrel 11, but reversed through 180°. The pipe supporting clamp 49 is similar to that previously described and is mounted on a carriage 50 movable along the bed of the machine and may be operated by means of a hand screw or other suitable operating mechanism 51.

Hinged to the side plates 43 are movable side plates 52 corresponding to the side plates 17, the pivotal mounting for these side plates being indicated at 53. Carried between the side plates 52 is a fixed bending die 54 which is similar to the die 19 of Figure 1 and which forms the inside of the pipe bend. The opposite or outside die member is designated 55 and we have shown a fluid pressure cylinder 56 for operating this die member also.

The pipe clamping unit 57 is pivotally supported between the plates 52 on the set screws 58, and set screws 59 are provided for selectively engaging in the holes 60 in the movable side plates 52. We have shown the side plates as being of sufficient extent to permit enough holes for the pipe to be bent through an arc of 180° rather than through an arc of 90°. The side plates 52 have a downward extension 52a for connection with the piston rod 61 of fluid pressure operating jack or cylinder 62. The various fluid pressure jacks and cylinders may be controlled through any preferred or conventional operating valves (not shown), and as will be readily understood by those skilled in the art.

Figure 9:
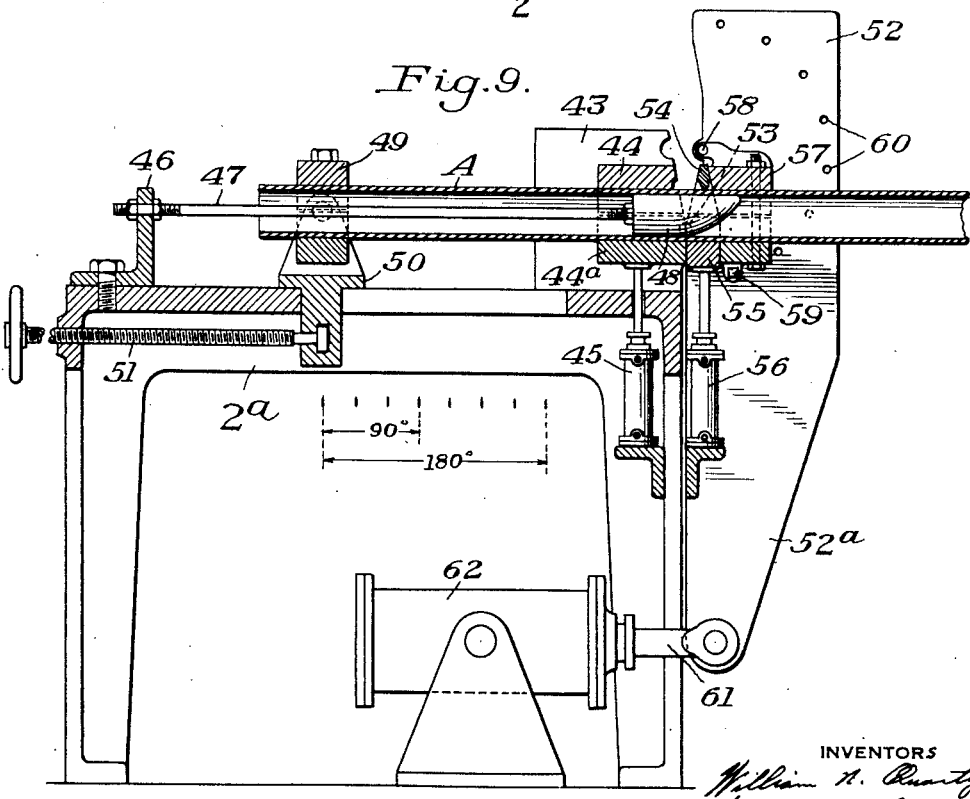
Figure 9 is a view similar to Fig. 1 of a modified construction wherein the bending of the pipe is effected upwardly instead of downwardly.

The arrangement shown in Figures 10, 11, 12 and 13 is generally the same as the arrangement shown in Figure 9 in that the pipe is bent vertically upward. It is different, however, in that the fixed pipe clamp and the bending die on the movable plates separate on a vertical plane instead of in a horizontal plane as previously described. There is also a slight change in the particular construction of the bending die itself.

In the arrangement shown in Figures 10, 11, 12 and 13 the bed of the machine is designated 70. On it is mounted a carriage 71 providing a pipe clamp 72, which carriage may be operated by a hand screw 73. The mandrel supporting bar is designated 74, while the mandrel bar itself is designated 75, and 76 designates the mandrel.

The table is provided with a plurality of upstanding lugs 77 through which passes a pivot or shaft 78. At the forward end of the table is a hinge supporting plate 79, this plate having lugs 80 thereon through which the shaft 78 also passes and which provides the hinged support for the table extension 79.

Rigidly secured to the table at one side of the rod or bar 75 is a vertical plate 81 having a pipe engaging and clamping portion 82 on its inner face. The table 70 has a slotted guideway 83 therein in which is retained a slide block 84. The slide block 84 carries an upright plate 85 similar to the plate 81, and which has a pipe engaging and clamping surface 86 which complements the clamping surface 82 of the plate 81. By moving the block 84 toward and away from the plate 81, the pipe clamp 82—86 can be closed or opened. For effecting this operation of the movable member, there is provided an operating mechanism, which in the embodiment shown, comprises a fluid pressure cylinder 87 having a connecting rod 88 secured to the plate 85. While the structure 81—82, 85—86 has relatively movable parts, it is, during the operation of the machine in the bending operation, a stationary clamp.

The hinged extension 79 of the table carries a fixed vertical plate 89 on which is secured part of the bending die.

The table extension 79 also has a slot 90 in it corresponding to the guideway 83 in which is a slide block 91. This slide block carries an upright plate 92. For moving the side plate 92 toward and away from the plate 89, an operating mechanism is provided. We have shown this as comprising a fluid pressure cylinder 93 with a connecting rod 94, the outer end of which is joined to the plate 92. The plates 89 and 92 carry complementary parts of the bending die, which is designated generally by the reference numeral 95. This bending die comprises a vertically divided block having two sections 96 secured to the plate 89; and 97 secured to the plate 92. The surfaces of the blocks 96 and 97, when they are closed as shown in Figure 11, provide a curved pipe receiving groove or channel in which are a plurality of transverse grooves or indentations 98 corresponding to the creases or ribs which are formed on the pipe during the process of bending, these grooves being of the greatest depth in the plane of the longitudinal center of the pipe and tapering off to the sides, and the body of metal between the grooves forms teeth-like ribs. These grooves are preferably located as close together as possible to receive closely spaced creases or ribs on the pipe when it is bent.

Located between the plates 89 and 92 is the adjustable pipe clamping unit 100. It is held in position by bolts 101 passing through holes 102 in the plates 89 and 92, these holes being equi-distantly positioned in an arc so that with the completion of each bend the clamping unit 100 can be adjusted by the removal of the bolts 101 and their insertion in the next succeeding holes.

The movable bending die comprising the plates 89 and 92 and the parts carried thereby is shown as having an operating means comprising a fluid pressure cylinder 103 with a piston rod 104 which is connected at 105 with an extension 106 depending from the hinged shelf or table extension 79.

In operation, the plates 85 and 92 are retracted by operation of the fluid pressure cylinders 87 and 93, respectively, and the pipe is inserted as previously described. The pipe clamping unit 100 may be tightened onto the pipe by means of bolts 100a, and the fluid pressure cylinders 87 and 93 are operated to push the plates 85 and 92 into their operating position. The bolts 101 are then inserted through the proper holes 102 to hold the pipe clamping unit 100 rigidly between the plates 89 and 92, and the pipe clamp 72 is bolted tightly to the pipe. The electrodes, which are not shown but which are arranged as hereinbefore described, are then swung into contact with the pipe and the pipe is locally heated at that portion which is to form the inside of the bend. After the pipe has been heated and the electrodes withdrawn, the fluid pressure cylinder 103 is operated to swing the table extension 79 upwardly, as viewed in Figure 10, causing the pipe to be crimped and bent, as previously explained. After the bending operation, the bolts 101 are removed, the plates 85 and 92 retracted from their operative position, the shelf 79 swung back to the position shown in Figure 10, and the pipe advanced toward the right, as viewed in Figure 10, to the next bending operation.

The cycle of operation is again repeated, and this is done as many times as is necessary to form a bend of the desired curvature. The grooves or recesses 98 in the cooperating members 96 and 97 of die 95 serve to successively receive the ribs as they are formed on the pipe and anchor the pipe against slipping, giving the inner surface of the curve a firm support to prevent creeping.

It will be noted that in this form of the machine the provision of the upstanding lugs 77 and 80 enables the axis about which the bending movement occurs to be located well above the top of the table 70 and below the longitudinal axis of the pipe, whereby there is a negligible stretching of the metal at the outside of the bend and a maximum compression and upsetting at the inside of the bend.

Referring to Figures 14 and 15, we have found that more effective heating in some cases can be secured by increasing the contact area of the electrodes and arranging the electrodes in longitudinally spaced relation, whereby the portion of the pipe intervening between the electrodes is heated up for a short distance along the length of the pipe. In these figures we have shown only the electrodes and the pipe, the other parts of the machine being omitted for the purpose of clarity. The pipe is designated A' and the two electrodes, which are arranged for movement toward and away from the pipe the same as the electrodes 41 in Figure 8, are designated 110 and 111. These electrodes have pipe engaging portions 112 of increased area, the portions 112 having a substantially semi-circular recess conforming to the curvature of the pipe.

As shown in Figure 15, the two electrodes are spaced apart so that the intervening portion of the pipe is heated. By reason of the fact that the electrodes have a relatively large surface contact with the pipe, the heating current is distributed over a relatively large area and substantially half of the pipe is heated. The electrodes are so positioned that the portion of the pipe which is heated is the portion which forms the inside of the bend. With this arrangement a relatively larger area of the pipe which forms the inside of the bend can be heated than with the arrangement shown in Figure 8. While Figures 14 and 15 do not disclose the remainder of the pipe bending mechanism, this being similar to that described, it will be understood that the electrodes enter into engagement with the pipe in that portion which is exposed between the two pipe clamps.

While we have particularly described certain specific embodiments of our invention and of the machine for carrying out the process, it will be understood that this is by way of illustration and not by way of limitation, and that various changes and modifications may be made therein. Moreover, it is apparent that instead of the machine being constructed to bend the pipe upwardly or downwardly, the parts may be arranged to bend the pipe horizontally, either to the left or the right, this merely being a matter of positioning the various parts in the desired plane.

The method is characterized by the local heating of the pipe at the point which forms the inside of the curve, the compressing of this locally heated area lengthwise of the pipe to form a crimp in which the wall thickness of the metal is increased beyond the normal wall thickness of the pipe, and without substantial stretching of the metal at the outside of the pipe bend. In thus crimping the metal the inner surfaces of the crimped portion are not only offset but are forced so tightly together that there is only a very slight valley or transverse depression on the inside of the pipe at the inside of the bend as compared with the total diameter of the pipe. A further desirable feature is that the crimps or ribs are separated by a minimum spacing, one crimp being formed immediately back of the next, enabling the bend to turn about a very small radius.

The pipe bend itself is best shown in Figure 5, and possesses the advantages above noted,—that is, the increased metal thickness in the ribs, the relatively slight transverse valleys on the inside of the pipe, and the fact that the ribs are closed together and are formed without substantial stretching of the metal at the outside of the bend.

We claim:

1. The method of bending pipe which comprises heating the portion of the pipe adapted to form the inside of the bend, bending the pipe about a transverse axis located between the longitudinal axis of the pipe and the portion of the pipe forming the outside of the bend, and compressing and upsetting the heated portion of the pipe into a substantially solid transverse rib at the mid plane of the inside of the bend.

2. The method of bending pipe which comprises clamping the pipe at two closely adjacent points while leaving unsupported a wedge-shaped area of the pipe on that portion of the pipe which forms the inside of the bend, then moving one portion of the pipe relatively to the other in an arc in such manner as to upset and pinch said unsupported portion of the pipe together.

3. The method of bending pipe which comprises holding and supporting the pipe at two places one of which is positioned immediately adjacent the other while leaving unsupported between the places of support an area of pipe on that surface of the pipe which is to form the inside of the pipe bend, heating the unsupported portion of the pipe to a forging heat, and then moving one supported portion of the pipe relatively to the other in an arc while restraining the pipe against endwise movement to thereby upset and crimp the unsupported portion of the pipe between the points of support for the pipe until the crimp at the inside of the bend constitutes a substantially solid rib of metal.

4. The method of bending pipe which comprises holding the pipe at two points to confine the pipe against longitudinal movement and while leaving unsupported an area of the pipe between the two places where the pipe is held on that side of the pipe adapted to form the inside of the bend, heating said unsupported portion of the pipe to a forging heat, then moving one portion of the pipe in an arc relatively to the other in such manner as to upset and crimp said unsupported portion of the pipe, the center of bending movement being located between the original longitudinal axis of the pipe and the portion of the pipe which forms the outside wall of the bend, whereby the stretching action on said outside wall is substantially negligible.

5. The method of bending pipe which comprises pinching and longitudinally upsetting the metal forming the inside of the bend of the pipe together to shorten the length of the inner portion of the pipe and increase its thickness thereby forming a substantially solid rib of metal on the inside of the bend of gradually diminishing height around the sides of the pipe and without substantial stretching of that portion of the pipe forming the outside of the bend.

6. A pipe bending machine comprising a pair of pipe clamps one of which is movable relatively to the other in an arc, said pipe clamps being in alinement and being shaped to leave unsupported a wedge or segment-like area of pipe in that portion of the pipe adapted to form the inside of the bend, and means for moving one of said clamps in an arc relative to the other to compress said unsupported area of the pipe being bent.

7. A pipe bending machine comprising a supporting frame having a pipe clamp thereon adapted to receive and hold a pipe to be bent, a hinged member having a pipe clamp thereon adapted to move in an arc with respect to said first pipe clamp, the axis of movement of the hinged clamp being located adjacent the portion of a pipe received in said clamps adapted to form the outside of the bend, the end of one of said clamps being beveled with respect to the other whereby a pipe received within the clamps is unsupported for a short distance between the two clamps along the portion adapted to form the inside of the bend.

8. A pipe bending machine comprising a supporting frame having a pipe clamp thereon adapted to receive and hold a pipe to be bent, a hinged member having a pipe clamp thereon adapted to move in an arc with respect to said first pipe clamp, the axis of movement of the hinged clamp being located adjacent the portion of a pipe received in said clamps adapted to form the outside of the bend, the end of one of said clamps being beveled with respect to the other whereby a pipe received within the clamps is unsupported for a short distance between the two clamps along the portion adapted to form the inside of the bend, and means for applying heat to said unsupported portion of a pipe which is received within the clamps.

9. A pipe bending machine comprising two pipe clamping units positioned closely adjacent one another, one of said units having a beveled end portion thereon to give clearance for arcuate movement thereof with respect to the other unit, one of said units being movable in an arc with respect to the other, the units being adapted to clamp a pipe and restrain the same from endwise movement, the clamps being such that when a pipe is positioned therein and the axes of the two units are alined a substantially wedge-shaped area of the pipe is left exposed between the adjacent ends of the two clamps, said arcuately movable clamp having a pivotal support, the arcuate movement enabling the pipe clamped by said unit to be crimped when the one unit is moved in an arc relative to the other.

10. A pipe bending machine comprising two pipe clamping units positioned closely adjacent one another, one of said units having a beveled end portion thereon to give clearance for arcuate movement thereof with respect to the other unit, one of said units being movable in an arc with respect to the other, the units being adapted to clamp a pipe and restrain the same from endwise movement, the clamps being such that when a pipe is positioned therein and the axes of the two units are alined a substantially wedge-shaped area of the pipe is left exposed between the adjacent ends of the two clamps, said arcuately movable clamp having a pivotal support, the arcuate movement enabling the pipe clamped by said unit to be crimped when the one unit is moved in an arc relative to the other, the pivotal axis for said movable clamp being eccentric to the longitudinal axis of a pipe received within the clamps and being nearer the portion of the pipe which forms the outside of the bend.

11. A pipe bending machine comprising two pipe clamping units positioned closely adjacent one another, one of said units having a beveled end portion thereon to give clearance for arcuate movement thereof with respect to the other unit, one of said units being movable in an arc with respect to the other, the units being adapted to clamp a pipe and restrain the same from endwise movement, the clamps being such that when a pipe is positioned therein and the axes of the two units are alined a substantially wedge-shaped area of the pipe is left exposed between the adjacent ends of the two clamps, said arcuately movable clamp having a pivotal support, the arcuate movement enabling the pipe clamped by said unit to be crimped when the one unit is moved in an arc relative to the other, the pivotal axis for said movable clamp being eccentric to the longitudinal axis of a pipe received within the clamps and being nearer the portion of the pipe which forms the outside of the bend, the other die also having a cooperating beveled surface.

12. A pipe bending machine comprising a stationary pipe clamping unit having a pipe receiving passage therethrough, an arcuately movable pipe clamping member having a pipe receiving passage therethrough, said movable pipe clamping member being positioned closely adjacent the fixed pipe clamping unit and being movable from a position where the pipe receiving passageway thereof is in alinement with the pipe receiving passage of a stationary unit to a position where it is at an angle thereto, the stationary pipe clamping unit and the movable pipe clamp having cooperating beveled surfaces permitting the arcuate movement of said movable clamp, and a mandrel projecting into the pipe receiving passageways of the clamps.

13. A pipe bending machine comprising a stationary pipe clamping unit, a supporting frame structure movable in an arc with respect to said stationary pipe clamping unit, a bending die unit on said movable supporting frame, said stationary pipe clamping unit and said bending die unit having pipe receiving openings therethrough adapted to be brought into alinement, the portion of the pipe bending die adapted to engage the outer part of the pipe bend forming substantially a continuation of the fixed clamping unit, the portion of the bending die adapted to engage the part of the pipe forming the inner end of the bend being spaced away from the stationary clamping die, said movable supporting structure being supported for movement about an axis which is eccentric to the longitudinal axis of the pipe receiving opening of the stationary pipe clamping unit and nearer the portion of the pipe which forms the outside of the pipe bend.

14. A pipe bending machine comprising a stationary pipe clamping unit, a supporting frame structure movable in an arc with respect to said stationary pipe clamping unit, a bending die unit on said movable supporting frame, said stationary pipe clamping unit and said bending die unit having pipe receiving openings therethrough adapted to be brought into alinement, the portion of the pipe bending die adapted to engage the outer part of the pipe bend forming substantially a continuation of the fixed clamping unit, the portion of the bending die adapted to engage the part of the pipe forming the inner end of the bend being spaced away from the stationary clamping die, said movable supporting structure being supported for movement about an axis which is eccentric to the longitudinal axis of the pipe receiving opening of the stationary pipe clamping unit and nearer the portion of the pipe which forms the outside of the pipe bend, and an arcuately adjustable clamping block movable through a succession of positions carried on said movable supporting frame.

15. A pipe bending machine comprising a supporting structure, a fixed pipe clamping unit thereon comprising a pipe clamp adapted to be opened and closed and having a pipe receiving opening therethrough, a hinged supporting frame projecting forwardly beyond said fixed clamping unit and having a pipe engaging clamp thereon with a pipe receiving opening therethrough adapted to form an extension of the opening through said fixed pipe clamp when said hinged supporting frame is in one position, and adapted to be moved by swinging said supporting frame to an angle with respect to said stationary pipe clamping unit, the two clamping units having cooperating angular faces permitting the angular movement of the second pipe clamping unit with respect to the first, and a third pipe clamping unit on the hinged frame arcuately adjustable with respect thereto by means of which it may be selectively set at various angles with respect to the supporting frame on which it is carried, the axis for movement of the hinged supporting frame being off-center with respect to the axis of the pipe receiving opening in the stationary pipe clamping unit.

16. A pipe bending machine comprising a supporting bed, a carriage movable along the bed, a pipe clamp on said carriage, means for adjusting the carriage along the bed, a stationary pipe clamping unit on the bed in alinement with the pipe clamping unit on the carriage, a forwardly projecting supporting structure beyond said stationary pipe clamping unit, said forwardly projecting supporting structure being movable through a limited arc with respect to the stationary clamping unit, a pipe clamp on said forwardly extending frame, said last mentioned pipe clamping unit being positioned closely adjacent the end of said stationary pipe clamping unit along that portion of the pipe which is adapted to form the outside of a pipe bend, the two last mentioned pipe clamping units having the end surfaces thereof so shaped as to expose a wedge-shaped area of that portion of a pipe received within said clamps which is adapted to form the inside of a pipe bend, and means for moving said forwardly extending frame with its pipe clamp through an arc with respect to the stationary pipe clamping unit to crimp such exposed wedge-shaped area of the pipe.

17. A pipe bending machine comprising a supporting bed, a carriage movable along the bed, a pipe clamp on said carriage, means for adjusting the carriage along the bed, a stationary pipe clamping unit on the bed in alinement with the pipe clamping unit on the carriage, a forwardly projecting supporting structure beyond said stationary pipe clamping unit, said forwardly projecting supporting structure being movable through a limited arc with respect to the stationary clamping unit, a pipe clamp on said forwardly extending frame, said last mentioned pipe clamping unit being positioned closely adjacent the end of said stationary pipe clamping unit along that portion of the pipe which is adapted to form the outside of a pipe bend, the two last mentioned pipe clamping units having the end surfaces thereof so shaped as to expose a wedge-shaped area of that portion of a pipe received within said clamps which is adapted to form the inside of a pipe bend, means for moving said forwardly extending frame with its pipe clamp through an arc with respect to the stationary pipe clamping unit to crimp such exposed wedge-shaped area of the pipe, and a holding clamp on said forwardly extending frame adjustable to the angularity of the resulting bend which is formed in the pipe, and means for locking said last named clamp in the position to which it is adjusted, all of said pipe clamps being arranged to open and close on the pipe to hold the pipe during the bending operation and release it after it has been bent.

18. A pipe bending machine comprising a stationary clamping unit and a movable clamping unit movable from a position where it is in line with the stationary unit to a position where it is at an angle thereto and having an outer portion adapted to form with the stationary unit a substantially continuous pipe engaging surface when the two clamping units are in line, and having an inner portion spaced away from the stationary clamping unit to provide an unsupported area for a pipe passing through the two units when they are in alinement, and means for supporting the movable unit for arcuate movement about an axis which coincides with the line of separation between the two dies and located outside the longitudinal axis of a pipe passing through the dies.

19. A pipe bending machine comprsising a stationary clamping unit and a movable clamping unit movable from a position where it is in line with the stationary unit to a position where it is at an angle thereto and having an outer portion adapted to form with the stationary unit a substantially continuous pipe engaging surface when the two clamping units are in line, and having an inner portion spaced away from the stationary clamping unit to provide an unsupported area for a pipe passing through the two units when they are in alinement, means for supporting the movable unit for arcuate movement about an axis which coincides with the line of separation between the two dies and located outside the longitudinal axis of a pipe passing through the dies, there being a wedge-shaped crevice between the inner surfaces of the dies when they are in alinement through which a pipe positioned in the dies is exposed, and electrodes mounted for movement into and out of said crevice and arranged to engage the pipe to heat the exposed portion thereof.

20. A pipe bending machine comprising a stationary clamping unit and a movable clamping unit movable from a position where it is in line with the stationary unit to a position where it is at an angle thereto and having an outer portion adapted to form with the stationary unit a substantially continuous pipe engaging surface when the two clamping units are in line, and having an inner portion spaced away from the stationary clamping unit to provide an unsupported area for a pipe passing through the two units when they are in alinement, means for supporting the movable unit for arcuate movement about an axis which coincides with the line of separation between the two dies and located outside the longitudinal axis of a pipe passing through the dies, there being a wedge-shaped crevice between the inner surfaces of the dies when they are in alinement through which a pipe positioned in the dies is exposed, and electrodes mounted for movement into and out of said crevice and arranged to engage the pipe to heat the exposed portion thereof, said electrodes being carried on pivotally supported levers.

21. A pipe bending machine comprising a stationary clamping unit and a movable clamping unit movable from a position where it is in line with the stationary unit to a position where it is at an angle thereto and having an outer portion adapted to form with the stationary unit a substantially continuous pipe engaging surface when the two clamping units are in line, and having an inner portion spaced away from the stationary clamping unit to provide an unsupported area for a pipe passing through the two units when they are in alinement, means for supporting the movable unit for arcuate movement about an axis which coincides with the line of separation between the two dies and located outside the longitudinal axis of a pipe passing through the dies, there being a wedge-shaped crevice between the inner surfaces of the dies when they are in alinement through which a pipe positioned in the dies is exposed, electrodes mounted for movement into and out of said crevice and arranged to engage the pipe to heat the exposed portion thereof, and a third pipe clamping unit mounted for movement with said movable pipe clamping unit and adjustable in an arc relatively thereto.

22. A pipe bending machine comprising a stationary pipe clamp arranged to be opened and closed, a bending die located immediately adjacent the end of the stationary clamp and movable in an arc with respect thereto, said bending die having a rib portion adapted to engage the inner surface of a pipe supported in said clamp at a point spaced away from the end of said stationary die, said rib being movable upon movement of the die in an arc toward and away from the stationary pipe clamp.

23. A pipe bending machine comprising a stationary pipe clamp arranged to be opened and closed, a bending die located immediately adjacent the end of the stationary clamp and movable in an arc with respect thereto, said bending die having a rib portion adapted to engage the inner surface of a pipe supported in said clamp at a point spaced away from the end of said stationary die, said rib being movable upon movement of the die in an arc toward and away from the stationary pipe clamp, said bending die also comprising a pipe clamp.

24. A pipe bending machine comprising a stationary pipe clamp arranged to be opened and closed, a bending die located immediately adjacent the end of the stationary clamp and movable in an arc with respect thereto, said bending die having a rib portion adapted to engage the inner surface of a pipe supported in said clamp at a point spaced away from the end of the stationary die, said rib being movable upon movement of the die in an arc toward and away from the stationary pipe clamp, said bending die also comprising a pipe clamping unit, and another pipe clamping unit supported for movement with the die and adjustable in an arc with respect thereto.

25. A pipe bending machine comprising a stationary pipe clamp arranged to be opened and closed, a bending die located immediately adjacent the end of the stationary clamp and movable in an arc with respect thereto, said bending die having a rib portion adapted to engage the inner surface of a pipe supported in said clamp at a point spaced away from the end of said stationary die, said rib being movable upon movement of the die in an arc toward and away from the stationary pipe clamp, said bending die also comprising a pipe clamp and having a succession of other similar ribs disposed in an arc after said first rib.

26. A pipe bending machine comprising a stationary pipe clamp arranged to be opened and closed, a bending die located immediately adjacent the end of the stationary clamp and movable in an arc with respect thereto, said bending die having a rib portion adapted to engage the inner surface of a pipe supported in said clamp at a point spaced away from the end of said stationary die, said rib being movable upon movement of the die in an arc toward and away from the stationary pipe clamp, said bending die also comprising a pipe clamp, and means for operating said clamps to open and close them and means for moving the bending die in an arc.

27. A pipe bending machine comprising a stationary pipe clamp arranged to be opened and closed, a bending die located immediately adjacent the end of the stationary clamp and movable in an arc with respect thereto, said bending die having a rib portion adapted to engage the inner surface of a pipe supported in said clamp at a point spaced away from the end of said stationary die, said rib being movable upon movement of the die in an arc toward and away from the stationary pipe clamp, said bending die also comprising a pipe clamping unit, another pipe clamping unit supported for movement with the die and adjustable in an arc with respect thereto, a pipe supporting carriage, and means for adjusting the carriage longitudinally with respect to the stationary clamp.

28. A pipe bending machine comprising a stationary pipe clamp arranged to be opened and closed, a bending die located immediately adjacent the end of the stationary clamp and movable in an arc with respect thereto, said bending die having a rib portion adapted to engage the inner surface of a pipe supported in said clamp at a point spaced away from the end of said stationary die, said rib being movable upon movement of the die in an arc toward and away from the stationary pipe clamp, the axis of movement of the bending die being outside the axis of a pipe engaged in said clamp and die and with respect to the location of said rib and substantially in the plane of the end of the stationary clamp.

29. A pipe bending machine comprising a stationary pipe clamp arranged to be opened and closed, a bending die located immediately adjacent the end of the stationary clamp and movable in an arc with respect thereto, said bending die having a rib portion adapted to engage the inner surface of a pipe supported in said clamp at a point spaced away from the end of said stationary die, said rib being movable upon movement of the die in an arc toward and away from the stationary pipe clamp, the axis of movement of the bending die being outside the axis of a pipe engaged in said clamp and die and with respect to the location of said rib and substantially in the plane of the end of the stationary clamp, and a mandrel extending into the clamp and die and having straight inner side and a rounded outer side.

30. A pipe bending machine comprising a stationary pipe clamp arranged to be opened and closed, a bending die located immediately adjacent the end of the stationary clamp and movable in an arc with respect thereto, said bending die having a rib portion adapted to engage the inner surface of a pipe supported in said clamp at a point spaced away from the end of said stationary die, said rib being movable upon movement of the die in an arc toward and away from the stationary pipe clamp, the axis of movement of the bending die being outside the axis of a pipe engaged in said clamp and die and with respect to the location of said rib and substantially in the plane of the end of the stationary clamp, a mandrel extending into the clamp and die and having a straight inner side and a rounded outer side, and a pipe gripping clamp supported for movement with the bending die and independently adjustable in an arc with respect thereto.

31. In a pipe bending machine of the class described, a pair of electrodes for heating that portion of the pipe which forms the inside of the bend only arranged in spaced relation longitudinally of the pipe, and having pipe engaging surfaces thereon which contact only with that portion of the pipe which is to form the inside of a pipe bend.

32. In a pipe bending machine of the class described, means for heating a pipe at that portion which forms the inside of the bend, comprising a pair of electrodes movable into and out of engagement with the pipe, said electrodes being spaced apart longitudinally of the pipe and having substantially semi-circular pipe engaging portions thereon conforming to the curvature of the pipe to be heated.

33. The method of forming a pipe bend which comprises gripping the pipe at two points in its length to confine the pipe against longitudinal movement and leaving unsupported between the two places where the pipe is gripped an area of the pipe which is to form the inside of the bend, heating this unsupported area which is to form the inside of the bend to a forging temperature and leaving the portion of the pipe which is to form the outside of the bend relatively cooler, and then moving one clamped portion of the pipe relatively to the other to compress a segment shaped area of the heated portion of the pipe into a rib which is substantially solid at the mid plane of the pipe and in which the thickness of the metal exceeds the original thickness of the metal of the pipe.

WILLIAM N. QUARTZ.
WILLIAM J. BANNEN.